May 27, 1947.　　　　R. S. KERNS　　　　2,421,070
PRESSURE WELDING APPARATUS
Filed Feb. 9, 1944　　　　4 Sheets-Sheet 1

INVENTOR
ROY S. KERNS
BY
ATTORNEY

May 27, 1947.                R. S. KERNS                2,421,070
                      PRESSURE WELDING APPARATUS
                        Filed Feb. 9, 1944          4 Sheets-Sheet 2

Fig. 2.

INVENTOR
ROY S. KERNS
BY
*Ed Greenewald*
ATTORNEY

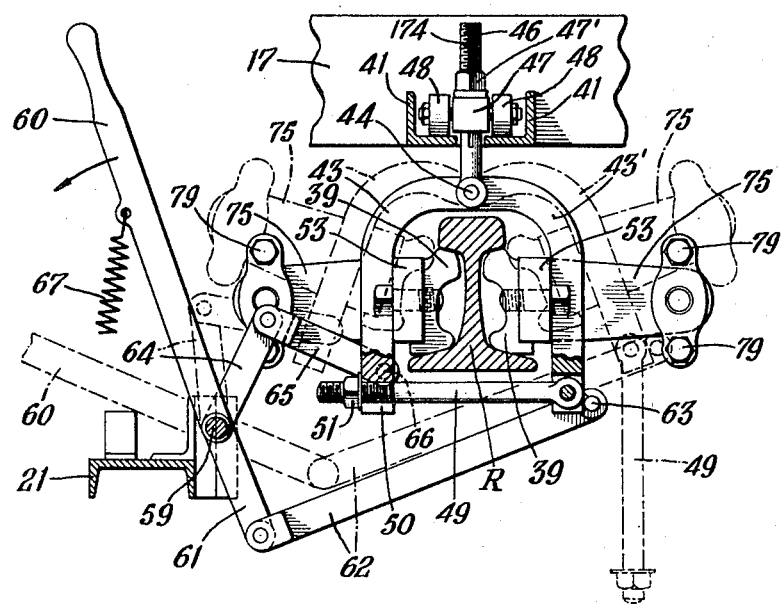
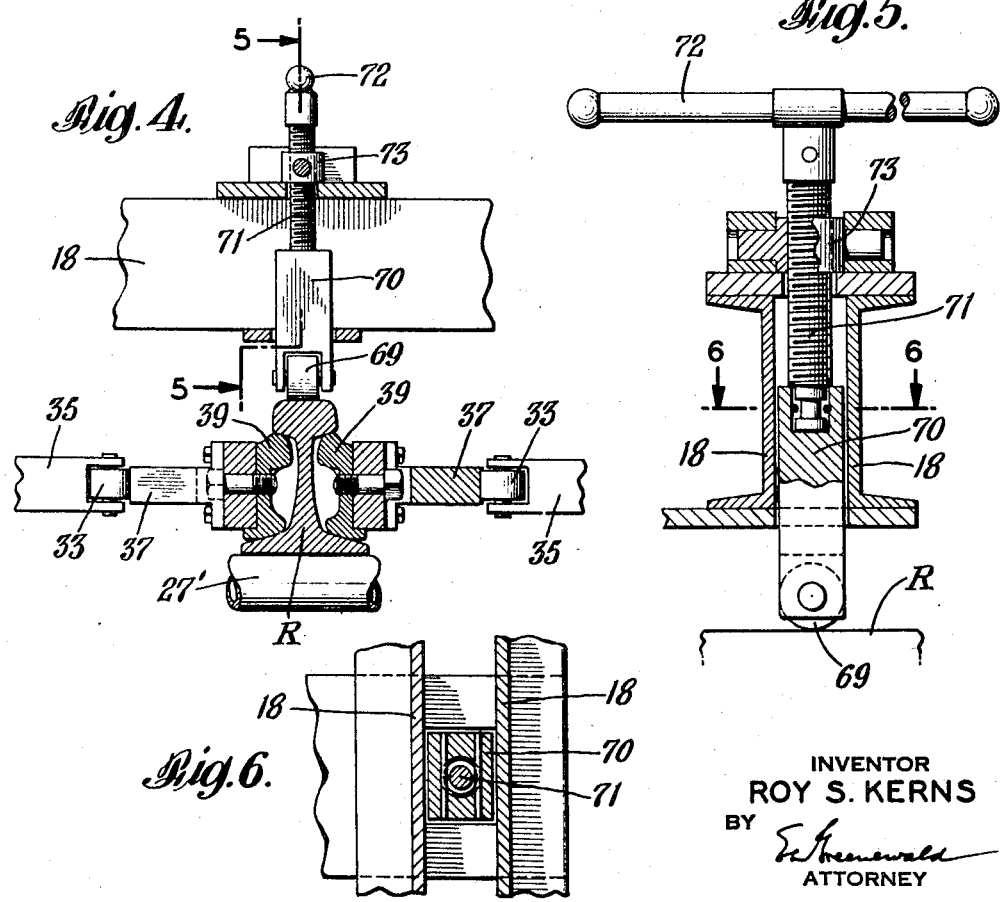

May 27, 1947.  R. S. KERNS  2,421,070
PRESSURE WELDING APPARATUS
Filed Feb. 9, 1944  4 Sheets-Sheet 4
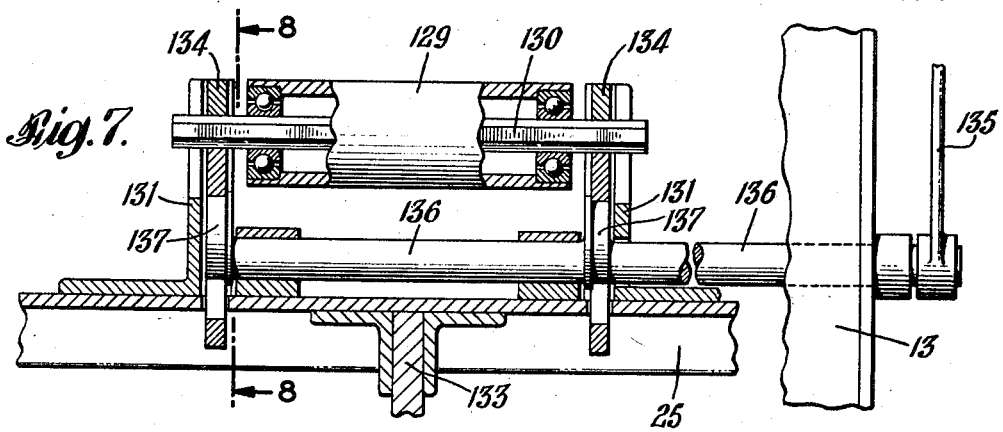
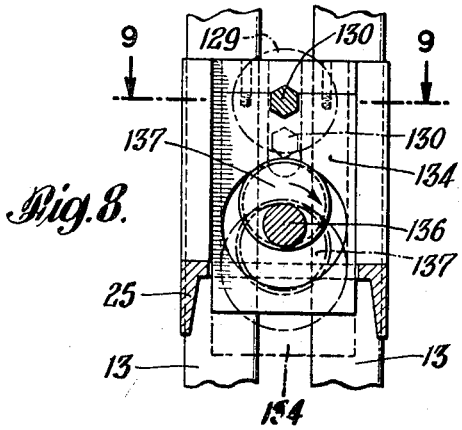
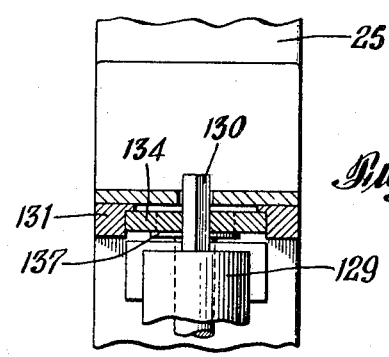
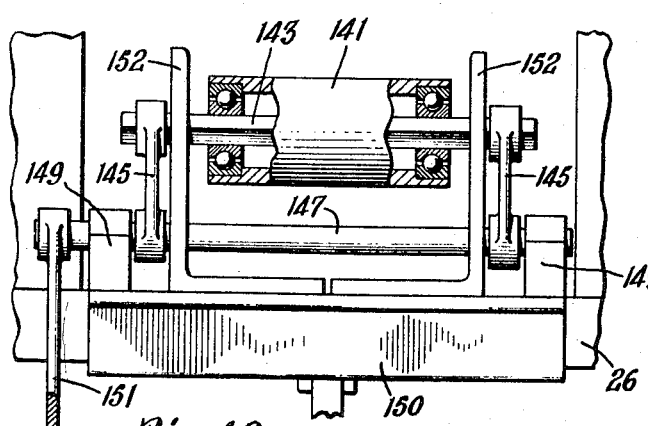
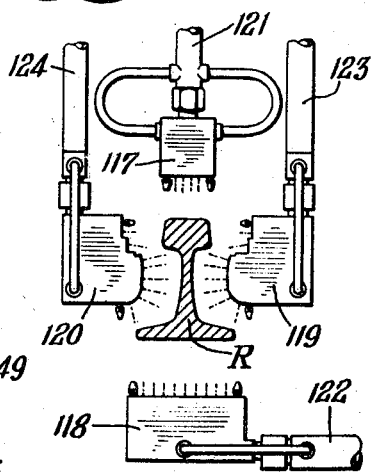
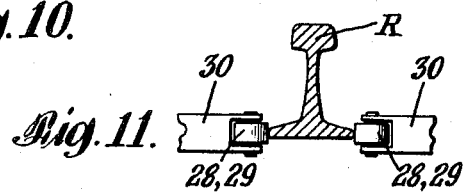
INVENTOR
ROY S. KERNS
BY
ATTORNEY Patented May 27, 1947

2,421,070

UNITED STATES PATENT OFFICE 2,421,070

PRESSURE WELDING APPARATUS

Roy S. Kerns, Chicago, Ill., assignor to The Linde Air Products Company, a corporation of Ohio Application February 9, 1944, Serial No. 521,619

9 Claims. (Cl. 78—82)

This invention relates to the pressure butt welding of members of weldable metal; and more especially it concerns a novel apparatus for the production of continuous welded metal structures of great strength, preferably using oxy-fuel gas mixtures for supplying the welding heat. For simplicity the invention will be described in connection with the pressure butt welding of steel rails. However, it is equally useful for welding other articles such as pipes, tubing, bars, rods, beams and the like, made of weldable materials.

Processes already are known for butt welding rails and the like while abutting surfaces thereof are forced together under high pressure. Generally, the surfaces to be welded are prepared for welding by a grinding or a machining operation, after which the members are aligned with the prepared ends in abutting relation. The rail ends are then welded throughout the abutting surfaces by a modification of the oxy-fuel gas welding procedure, while forcing the rail ends together under pressure.

In apparatus heretofore used for such pressure welding operations, one of the members is clamped in fixed position and the other member is secured by a clamp which, during the metal upsetting stage, moves toward the welding interface in order to maintain a selected pressure continuously during the metal upsetting step. As a result, the welding interface is gradually displaced longitudinally of the members a distance which varies with the amount of shortening of the members. Such displacement usually occurs during a brief interval forming a small part of the heating cycle, the time varying with such factors as the heat volume, distribution, etc. This shifting of the interface may result in uneven heating of the abutting ends to be welded unless the operator closely observes the operation and shifts the welding flames to follow the interface when and as the metal upsetting proceeds.

Among the more important objects of this invention are the following: to provide for moving each of the members being welded toward the welding interface as metal upsetting progresses during a pressure welding operation; to provide novel means for maintaining the interface between abutting members in fixed relation with the center of reciprocation of a welding head throughout a pressure welding operation; to provide in novel manner for maintaining rails and other metal members in longitudinal, vertical and horizontal alignment during a pressure welding operation; to provide novel means for pressure welding metal members having different cross-sections; to provide welding apparatus wherein means for clamping each of two members and for forcing them together under pressure are freely movable longitudinally of a supporting frame and are movable as a unit into and out of clamping contact with said members; and to provide for removing from welding apparatus a massive welded joint having an annulus of upset metal while avoiding injury to the supporting structure. These and other objects will be evident from the following description.

In the accompanying drawings wherein one preferred embodiment of the invention is illustrated, Fig. 1 is a side elevation of a rail welding apparatus, parts being broken away;

Fig. 2 is a broken horizontal section taken along the line 2—2 of Fig. 1, looking in the direction of the arrows, parts being broken away, and other parts being omitted;

Fig. 3 is a transverse vertical section through a clamping assembly and associated parts, with a rail in position, parts being omitted;

Fig. 4 is a transverse section through a rail and associated aligning members, parts being broken away, and parts omitted;

Fig. 5 is an enlarged section taken along the line 5—5 of Fig. 4;

Fig. 6 is a section taken along the line 6—6 of Fig. 5;

Fig. 7 is a section taken along the line 7—7 of Fig. 1, looking in the direction of the arrows, parts being omitted, and other parts broken away;

Fig. 8 is a section taken along the line 8—8 of Fig. 7;

Fig. 9 is a section taken along the line 9—9 of Fig. 8;

Fig. 10 is a section taken along the line 10—10 of Fig. 1, looking in the direction of the arrows, parts being broken away, and other parts being shown in section;

Fig. 11 is a section taken through a rail and lateral aligning members at the leaving end of the apparatus; and Fig. 12 is a transverse section taken through a rail adjacent the welding zone, showing the relationship of rails and welding heads.

Figure 1:
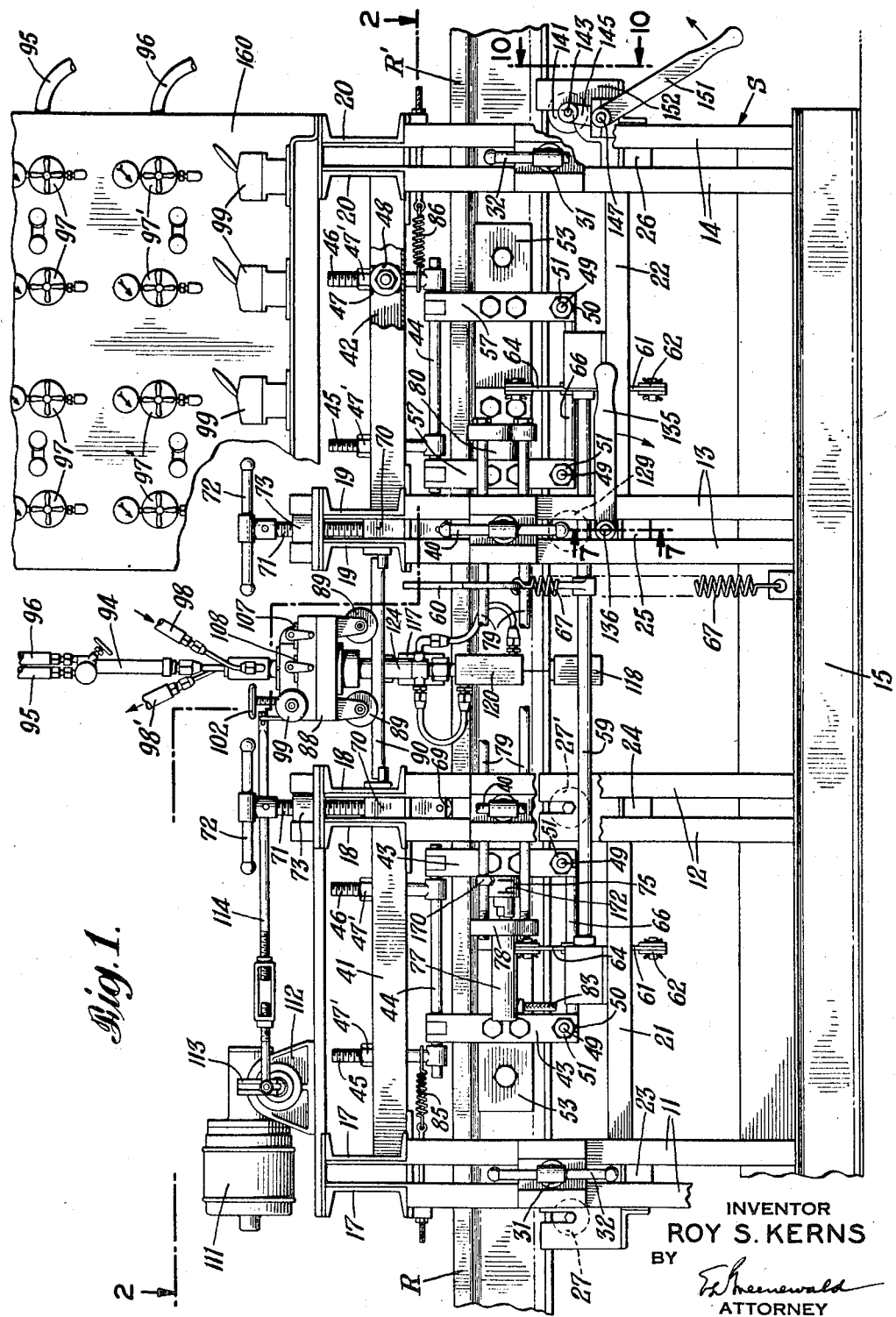

Referring to Figures 1 and 2 of the drawings, a supporting frame S made of structural steel members preferably welded together includes spaced pairs of interconnected vertical channel members 11, 12, 13, 14, supported on I-beams 15 and connected at their upper ends by pairs of spaced interconnected channel members 17, 18, 19 and 20. Horizontal supports 21, 22 connect members 11, 12 and members 13, 14 at each side of the frame; and reinforced transverse bracing and supporting members 23 to 26 connect the pairs of channel members 11 to 14 at the respective sides of the frame.

During use, the rails to be welded are brought into the frame from the left, as shown in Figure 1; and this will be called the entering end, and the opposite end the leaving end. For supporting the rails upon the frame a rail-supporting roller 27 is rotatably mounted upon a bracket carried by frame member 23 and an associated angle bar. A similar roller 27' is rotatably mounted in a bracket carried by frame member 24. The rollers 27, 27' support a rail at the entering end. The rail at the leaving end is supported upon rollers 129, 141 hereinafter described.

For accurately aligning two rails with their ends in abutting relation, pairs of aligning assemblies are carried by channel members 11 and 14 as best shown in Figures 2 and 11. Each of said assemblies comprises a pair of opposed rollers 28, 28 and 29, 29 mounted for rotation upon shafts 30 having threaded portions cooperating with threaded heads 31 carried by plates secured to members 11, 11 and 14, 14. The rollers 28, 29 press against the sides of the rail bases and, upon movement of handles 32, force the rails laterally any desired amount. Similarly, as shown in Figures 2 and 4, pairs of aligning assemblies are carried by channel members 12 and 13, each assembly comprising opposed rollers 33, 33 and 34, 34 mounted for rotation upon shafts 35 having threaded portions cooperating with internally threaded heads carried upon members 12, 12 and 13, 13. Each of the latter aligning assemblies presses against a shank 37 of a member secured to an interchangeable rail clamping bar 39 designed to wedgingly contact the head and base of a rail in well-known manner under action of handles 40, as shown in Figure 4.

For supporting the abutting ends of the two rails to be welded and for clamping the rails with their ends in abutting relation and in longitudinal alignment during a welding operation, two rail-clamping assemblies include a pair of laterally spaced angle members 41, 41 (Figure 1) which have their ends secured to members 17, 18 by welding or the like. A similar pair of spaced angle members 42, 42 have their ends secured to members 19, 20. Two spaced pairs of clamping members, 43, 43' at the entering end of the apparatus are adapted to straddle a rail. Each clamping member, 43, 43' is pivoted upon a pivot bar 44, the latter being supported for longitudinal movement and for vertical adjustment relative to a rail by two spaced clamp supports 45, 46. The latter extend through the spaces between the angle bars 41, and have threaded upper ends which extend through passages in carriers 47. The carriers are mounted upon rollers 48 for free movement along the tracks formed by the angle members 41. For vertically adjusting each pair of clamp supports 45, 46, and for maintaining the pivot bars and associated clamps in a selected horizontal position, lock nuts 47' cooperate with threads on members 45 and 46 and with carrier 47, as shown in Figure 3. A key (not shown) is disposed within the passage in each carrier and is slideable in a keyway 174 in the associated member 45 or 46, for preventing rotary movement of the latter during vertical adjustment. A clamping bolt 49 (see Figure 3) is pivotally mounted on one end of each member 43', and has a threaded end adapted to fit into a groove 50 in the end of an associated member 43 and to be located in position therein by means of a nut 51. Secured to each pair of clamping members 43, 43 and 43', 43' are clamping plates 53, 53 carrying interchangeable rail clamping bars 39.

Two spaced pairs of opposed rail-clamping members 57, 57' and associated parts, similar to members 43, 43' and associated parts 44 to 51, 53 and 39, are supported on angle members 42 for free longitudinal movement in the same manner as members 43, 43', etc. are supported on angle members 41.

For concurrently separating as a unit from the rails the clamping members of each pair, following removal of nuts 51, a rotatable shaft 59 (see Figure 3) is journalled on members carried by supports 21, 22 for rotation by means of lever 60. The shaft is connected with each of the clamping members 43' through a link 61 mounted on the shaft and having an end pivotally connected to a link 62 which, in turn, is pivoted on a rod 63 interconnecting the members 43'. The shaft 59 also is connected with each of the clamping members 43 through a link 64 secured to the shaft and pivotally connected to a link 65 pivoted on a rod 66 interconnecting the members 43. A spring 67 may be operatively interposed between the lever 60 and a frame member to assist in opening the clamping assemblies.

The arrangement of the clamping members and associated parts is such that the vertical adjustment of rails carried by the clamps is readily secured by regulating the members 45, 46 and lock nuts 47'. Since the clamping assembly for each rail is vertically adjustable independently of the assembly for the other rail, the apparatus is well adapted for use in butt welding rails or other members which differ in their cross-sectional sizes, as for example, a 110-pound rail and a 150-pound rail, for the production of step joints. Moreover, members which differ in cross-sectional conformation may be butt welded by use of the apparatus.

Furthermore, due to the independent adjustments of the respective clamp supports 45, 46, each rail or other member to be welded may be clamped either in a horizontal position or in a forwardly sloping position as may be desired for making a straight joint or a tapered joint.

For aligning the rails in a horizontal plane there are provided, as shown in Figures 1, and 4 to 6, two aligning assemblies respectively carried by the pairs of channel members 18, 18 and 19, 19. Each assembly comprises a roller 69 adapted to contact a rail head, and rotatable on a shaft carried by a rectangular shaft 70 having a threaded member 71 swivelled thereto at the opposite end. Each member 71 has a handle 72, and cooperates with internal threads in a member 73 carried by a plate secured to members 18, 18 and 19, 19.

For forcing together under a selected pressure the ends of two rails secured to the respective pairs of clamping members 43, 43' and 57, 57', jack lugs 75 are secured to the clamping plates 53 carried by the clamping members 43, 43'. The cylinders 77, 77' of two hydraulic jacks carry yokes 78 connected by rods 79 with lugs 80 carried by clamping plates 53 secured to clamping members 57, 57'. The piston rod 76 of each jack is secured within a corresponding boss 81 carried by the respective lugs 75, 75. Each jack is provided with an inlet for pressure fluid, connected through line 83 with a pump or other source of pressure fluid and with a point of discharge. A hand-operated portable pump 84 using an oil pressure-transmitting medium gives excellent results. When a valve 173 on portable pump 84 is opened the pressure fluid returns to pump 84 from cylinders 77, 77' through line 83. Spring 85 (Figure 1) connects the frame members 11 with the clamp support 45 of the left-hand clamp assembly; and spring 86 connects frame members 14 with clamp support 46 of the right-hand clamp assembly. These springs serve to separate the clamping assemblies upon release of the pressure from the cylinders 77 and retraction of the clamping members. The arrangement of parts is such that upon simultaneously applying pressure to each jack, the fluid in 77, 77' forces the cylinders with the associated parts to the left, at the same time forcing piston rods 76 and associated parts to the right, thus pressing the ends of the rails R, R' together.

For applying welding heat to a selected area of the rail metal at and adjacent the interface formed by the abutting rail ends, there preferably is provided, as shown in Figures 1 and 2, a torch carriage 88 mounted on wheels 89 movable on tracks 90 carried by the frame. Mounted upon carriage 88 in spaced relation and extending through apertures therein are a series of blowpipes 91, 92, 93 and 94 adapted to supply welding gases to a series of torch heads disposed, respectively, above the rail heads, below the rail bases, and at each side of the rail webs adjacent the abutting rail ends. Each blowpipe is supplied with fuel gas and oxygen through separate valve-controlled conduits 95 and 96, having therein pressure regulators 97, 97', and cut-off valves 99. The blowpipes have inlet and outlet connections 98, 98' for cooling water.

Blowpipes 91 to 94 are vertically adjustable in collars mounted on the carriage by means of racks and cooperating pinions controlled by handwheels 99 to 102 in well-known manner.

As best shown in Figure 2, blowpipes 93 and 94 are mounted upon plates 103, 104 slideable in grooves on the carriage under action of handwheels on rotatable rods 105, 106. These rods have threaded portions cooperating with internally threaded bearing members 107, 108, and have ends secured to brackets on the plates by means of collars 109 provided with lock screws.

For reciprocating the torch heads at a selected rate along a fixed path of selected length across the abutting ends of the rails, a variable speed electric motor 111, mounted on the frame (see Figure 1) drives a crank arm 113 through a reduction gear 112. A connecting rod 114 having means for regulating its length, has its respective ends pivotally connected to crank arm 113 and to a member secured to the carriage 88. The crank arm is adjustable radially in well-known manner for regulating the length of the path of reciprocation of the carriage.

For directing welding heat upon the rail ends, four fluid-cooled welding heads 117, 118, 119 and 120 are connected respectively with blowpipes 91 to 94 through water-jacketed conduits 121 to 124. The sides of torch heads 119, 120 facing the rails have contours conforming to the adjacent rail parts, as shown in Figure 12. The torch head construction, and the arrangement of the torch carriage and parts carried thereby, are in general similar to the torch carriage and associated parts described in United States Patent No. 2,231,014 of A. R. Lytle, W. Morton and L. V. Spangberg. However, welding heads advantageously may be oriented or twisted upon conduits 121 to 124 in manner to bring the paths of travel of adjacent torch tips so close together as to provide for the impingement upon the rails of a substantially continuous sheet of flame even when the tips are closely adjacent the rail metal.

During a pressure welding operation the large mass of upset metal extending laterally of heavy rails offers a serious obstacle to the removal from the welding apparatus of the welded joint in manner to prevent injury to the rail supports. This obstacle is overcome by the present invention.

As shown in Figures 7 to 9, a rail-supporting roller 129 is mounted on bearings carried upon a hexagonal axle 130 for movement out of the path of movement of the upset metal on a rail base as the rail is moved from the apparatus. The axle has its ends adapted to ride but not to turn in slots in spaced supporting members 131, 131 mounted upon transverse frame member 25 reinforced by member 133 (see Figure 7). The axle 130 has end portions secured in spaced members 134 provided with circular passages, the walls forming which cooperate with two cams 137, 137 mounted on a shaft 136 provided with a lever 135. The arrangement is such that when the lever 135 is turned in one direction, the cam action lowers the roller 129. The welded joint may then be drawn past the roller 129 by suitable apparatus such as a winch.

At the leaving end of the apparatus a rail-supporting roller assembly is mounted for movement in to and out of rail-supporting position. As shown in Figures 1, 2 and 10, this assembly comprises a roller 141 mounted on bearings carried by a hexagonal axle 143 having its ends secured to lever arms 145, 145. The latter in turn are secured to a shaft 147 rotatably mounted in bearings 149 supported upon frame members 26 and upon an angle member 150 secured to frame members 14, 14 and 26. Shaft 147 is rotated by means of a handle 151. The roller-carrying axle 143 is supported upon the curved upper surfaces of spaced angle members 152, 152 for movement along such surfaces. When handle 151 is turned in one direction, the roller 141 is lowered from contact with the rails, whereupon the welded joint with its upset metal may be drawn past that roller without contacting the same. Withdrawal of the welded joint from the apparatus may be effected by a winch or the like connected with the end of a continuous rail formed from a succession of rails previously joined by welding and suitably supported by rollers 13 shown in United States Patent No. 2,231,014.

An instrument panel 160 may be supported upon the frame as shown. These may be mounted upon this panel, the fuel gas and oxygen pressure regulators and gauges 97, 97', cut-off valves 99, and other regulating mechanism for each of the four blowpipes.

The preferred operation of the described modification of the apparatus will now be given.

Assuming that the clamping plates 53 and associated rail clamping bars 39 at each end of the machine are in retracted position, and assuming that two rails R, R' have been placed in the frame and are supported on rollers 27, 27', 129 and 141, the handles 32 and 40 are turned whereby the rollers associated therewith move the rails to secure their alignment in the same vertical plane. Operation of the handles 72 then force the rails down upon the rollers and bring the top of the rail heads in correct horizontal alignment in the event that one or both of the rails has a twist or a bend therein. The lever 60 is then actuated to close the clamping members 43, 43' and 57, 57', and the bolts 49 are tightened to secure the rails snugly in the position shown in full lines in Figure 3, with the clamping bars 39 wedgingly engaging the rails R, R'.

By operating the pump 84, or by connecting the inlet lines of the hydraulic cylinders 77 with a suitable supply of fluid under pressure, the piston rods 76 are forced against lugs 75, causing rail R to move into contact with rail R', whereupon the cylinders are pressed to the left in Figure 1, thereby forcing the rail ends together under the selected pressure. Any further vertical adjustment of either rail is readily secured prior to application of the pressure by means of one or more of the threaded members 45, 46 and the associated carrier members 47 supporting the clamping assemblies.

After the two abutting rails ends are in proper alignment and are pressed together, the torch heads are lighted and adjusted, the length of rod 114 is adjusted to center the carriage 88 over the abutting ends to be welded, and the motor 111 is actuated to reciprocate the torch carriage along a fixed path of selected length extending an equal distance on either side of the interface formed by the abutting rails. The rate of reciprocation of the carriage is controlled by adjusting the speed of the motor.

When the rail ends have reached a suitable welding temperature, the torch heads preferably are withdrawn somewhat to facilitate the formation of a substantially continuous envelope or sheet of flame and non-oxidizing gases around the periphery of the rails. This insures the production of sound welded joints even in instances where the members are not at first in intimate contact throughout the surfaces to be joined, since the gaseous envelope prevents substantial oxidation of the metal. Indeed, when using the present invention for welding pipes six inches or more in outside diameter, such as are used for overland pipe lines conveying oil and gas, good welded joints may be secured when the pipe ends to be united have been prepared by having at least a substantial portion of the surfaces bevelled to provide an included angle of as much as 20°.

As a welding temperature is reached, a slight softening and slow lateral upsetting of the metal occurs adjacent the interface between the rails under the action of heat and pressure, while the metal is still at temperatures below the liquidus temperature of the metal. The extent of upsetting varies with many factors, such as the rail size, and the welding temperature and pressure. The quality of a welded joint made from 112 pound rails has been found to be very satisfactory where the total shortening of the rails due to the upsetting is of the order of from around 0.5 inch to 2.0 inches. Welding temperatures around 1200° to 1300° C. are effectively used in conjunction with welding pressures ranging from around 1500 pounds to around 5000 pounds per square inch where the total reciprocating movement of the welding flames across the joint is of the order of from 0.5 inch to 5 inches.

The end of the welding operation is determined by the amount of shortening of the members being welded. For this purpose an indicator 170 is secured on one of the pressure-transmitting rods 79; and two spaced marks 172 are applied upon an associated lug 75, as shown in Figures 1 and 2. The indicator is aligned with one of the marks at the beginning of the welding operation. When the former has reached the second mark as a result of the upsetting of the rail metal, the flow of welding gases to the four torches is discontinued.

After the welded joint has cooled somewhat, it is ready for removal from the apparatus. The various handles 32, 40 and 72 are first turned to release the rail, the jack pressure is then released, after which the clamping bolts 49 are released, and the handle 60 is moved to unclamp the rails. Levers 135 and 151 then are moved to lower the rollers 129 and 141, the welded rail being supported by rollers 27, 27' and by means (not shown) similar to rollers 13 of Patent No. 2,231,014. By means of a winch or the equivalent the welded rail joint may then be withdrawn from the apparatus.

It is noteworthy that, by the use of this invention, each member being welded is secured to a plurality of spaced pairs of clamping members which are mounted for free frictionless movement longitudinally of the metal members being welded. Consequently, both of such members are free to move toward the welding interface when upsetting begins under action of the welding heat and the applied pressure. The center of reciprocation of the welding flames readily is maintained substantially coincident with the rail interface at all times during the welding operation. When using apparatus wherein one of the clamping means is fixedly secured to the supporting frame and only one clamp member is movable during the welding period, this important advantage has been securable only by extremely careful control by the operator, and manual shifting of the torch carriage as upsetting proceeds.

While, for purposes of illustration the clamps and associated rail-clamping bars are shaped for cooperating with rails to be welded together, it will be understood that, when welding pipes, tubing, bars, etc., the clamps—and clamping bars where required—will be shaped to accommodate and clamp such articles. Moreover, instead of using four separately-controlled torch heads, there may be employed sectional welding heads of annular or other suitable shape, such as those shown in the pending application Serial No. 350,680, of A. R. Lytle and W. Morton, and that shown in United States Patent No. 2,054,375.

The invention is susceptible of modification within the scope of the appended claims.

I claim:

1. Butt welding apparatus comprising a frame; means carried by said frame for supporting two elongated metal members at a plurality of longitudinally spaced points with a surface of each member in abutting relation; a plurality of clamping means carried by the frame independent of said supporting means and freely movable longitudinally of the frame for clamping each of said metal members at a plurality of longitudinally spaced points, each of said clamping means comprising spaced clamps, and means for vertically adjusting each clamp independently of the other clamp; means for freely moving all of said clamps as a unit to and from clamping position upon said metal members; means operatively connecting the clamping means associated with the respective metal members for moving each clamping means toward the other such means; and means supported by said frame for heating to a welding temperature the metal of said members at and adjacent the abutting surfaces.

2. Butt welding apparatus comprising a frame; means carried by said frame including rollers for supporting at a plurality of longitudinally spaced points two elongated metal members with a surface of each in abutting relation; a plurality of clamping means supported by the frame independently of said supporting rollers and movable longitudinally of said frame for clamping each of said metal members at longitudinally spaced points, each of said clamping means comprising spaced clamps, and means for vertically adjusting each clamp independently of the other clamps; means for moving all of said clamps as a unit to and from clamping position; means supported by said clamps for moving toward each other under pressure the clamps respectively associated with the two metal members; means for moving the rollers supporting one of said metal members out of the path of movement of the ridge of upset metal present at the welded joint as the latter is withdrawn from the frame; and means supported by said frame for heating to a welding temperature the metal of said members at and adjacent the abutting surfaces.

3. Apparatus for butt welding metal members which comprises a frame; means carried by the frame for supporting two metal members with a surface of each in abutting relation; means for shifting each of the metal members laterally of the frame independently of the other of said members and for securing each such member in selected position; clamping assemblies supported for free frictionless movement longitudinally of the frame independently of each other, each clamping assembly comprising spaced interconnected clamping units respectively adapted to be secured to a corresponding one of the metal members; means carried by said clamping assemblies and interconnecting the latter for forcing the clamping assemblies toward each other, thereby forcing together under pressure the metal members clamped by said clamping assemblies; and means supported by said frame for heating to a welding temperature the metal of said members at and adjacent the abutting surfaces.

4. Apparatus for butt welding metal members, which comprises means for supporting two of such members with a surface of each in abutting relation; a plurality of spaced aligning means interassociated with said supporting means for moving each of such metal members laterally in a horizontal plane independently of the other of said members; means for forcing the abutting surfaces of said members together under a high pressure, said means comprising a pair of floating clamping assemblies mounted for free movement toward and away from each other; means for securing each of said clamping assemblies to a corresponding metal member; means carried by said clamping assemblies for pressing the metal members together, the last-named means including fluid pressure-operated members, one of which is operatively connected with one clamping assembly, and pressure-transmitting means operatively connecting another of said pressure-operated members with the second clamping assembly; and means carried by said supporting means for heating to a welding temperature the metal of said members at and adjacent the abutting surfaces.

5. Apparatus for butt welding metal members, which comprises means for supporting two of such members with a surface of each in abutting relation; a plurality of spaced aligning means interassociated with said supporting means for moving each of such metal members laterally in a horizontal plane independently of the other of said members; means for forcing the abutting surfaces of said members together under a high pressure, said means comprising a pair of floating clamping assemblies mounted for free movement toward and away from each other; each clamping assembly being formed of spaced interconnected clamping units; each of such units being vertically adjustable independently of the other clamping unit of that assembly; means for securing each of said clamping assemblies to a corresponding metal member; means carried by said clamping assemblies for pressing the metal members together, the last-named means including fluid pressure-operated members, one of which is operatively connected with one clamp assembly, and pressure-transmitting means operatively connecting another of said pressure-operated members with the second clamping assembly; and means carried by said supporting means for heating to a welding temperature the metal of said members at and adjacent the abutting surfaces.

6. Apparatus for butt welding metal members, which comprises a frame, two spaced clamping assemblies supported by said frame for movement toward and from each other, each of said clamping assemblies having means for clamping one of two aligned metal members at a plurality of spaced points longitudinally thereof with a surface of each such member in abutting relation; each such assembly comprising at least two spaced pairs of opposed clamp members, means supported by said frame for vertically adjusting each pair of clamp members substantially independently of the other pairs thereof, and gripping members carried by each of the spaced pairs of clamp members; means carried by said clamping assemblies for forcing such assemblies toward each other and thereby forcing the two metal members together under high pressure; and means carried by the frame for heating to a welding temperature the said metal members at and adjacent the abutting surfaces.

7. Apparatus for butt welding metal members, which comprises a frame; means carried by the frame for supporting two metal members with a surface of each in abutting relation; a pair of clamping assemblies supported by said frame for free movement as a unit longitudinally of the latter; each such assembly comprising spaced interconnected clamping units, and means for clamping each such unit to a corresponding one of the metal members; means carried by said clamping assemblies and interconnecting the latter for forcing each of such assemblies toward the other, thereby forcing together under pressure the metal members clamped by said clamping assemblies; and means supported by said frame for heating to a welding temperature the metal of said members at and adjacent the abutting surfaces.

8. Apparatus for butt welding metal members, which comprises a frame; means carried by the frame for supporting two metal members with a surface of each in abutting relation; two clamping assemblies supported by said frame for free movement longitudinally of the frame independently of each other, each clamping assembly comprising spaced interconnected clamping units adapted to be secured to a corresponding one of the metal members, and means for vertically adjusting the respective clamping members of each of such assemblies independently of the clamping members of the other clamping assembly; means carried by said clamping assemblies and interconnecting the latter for forcing the clamping assemblies toward each other, thereby forcing together under pressure the metal members secured by said clamping assemblies; and means supported by said frame for heating to a welding temperature the metal of said members at and adjacent the abutting surfaces.

9. In apparatus for butt welding metal members and having means for heating to a welding temperature said metal members at and adjacent the abutting surfaces, the improvement which comprises two clamping assemblies for clamping each of two aligned metal members at a plurality of spaced points longitudinally thereof with a surface of each in abutting relation; each such assembly comprising at least two spaced pairs of clamp members, a plurality of means movable toward and away from each other for vertically adjusting each pair of clamp members substantially independently of another pair thereof, the vertically adjusting means associated with each pair of clamp members being movable toward and away from the vertically adjusting means associated with each other pair of clamp members, and gripping members carried by the spaced pairs of clamp members; and means carried by said clamping assemblies for forcing the two clamping assemblies toward each other, thus forcing together under high pressure the two members clamped thereby.

ROY S. KERNS.

REFERENCES CITED

The following references are of record in the file of this patent:

UNITED STATES PATENTS

| Number | Name | Date |
|---|---|---|
| 925,630 | Goldschmidt et al. | June 22, 1909 |
| 2,350,716 | Bissout et al. | June 6, 1944 |
| 2,040,240 | Coberly et al. | May 12, 1936 |
| 2,231,014 | Lytle et al. | Feb. 11, 1941 |
| Re. 20,348 | Hoffer | May 4, 1937 |
| 2,297,893 | Jones | Oct. 6, 1942 |
| 1,050,063 | Lange | Jan. 7, 1913 |
| 1,998,509 | Keith | Apr. 23, 1935 |

FOREIGN PATENTS

| Number | Country | Date |
|---|---|---|
| 497,632 | Great Britain | Dec. 22, 1938 |